Patented Feb. 20, 1951

2,542,897

UNITED STATES PATENT OFFICE 2,542,897

ANTISEPTIC WOUND DRESSINGS

Ethan Allan Brown, Boston, Mass., Manuel H. Gorin, Dallas, Tex., and Harold A. Abramson, Chevy Chase, Md.

No Drawing. Application October 12, 1945, Serial No. 622,082

7 Claims. (Cl. 167—58)

This invention relates to protective coatings and more particularly it relates to plastic type protective coatings for wounds.

Wounds have previously been protected by plastic-type coverings but such coverings have had marked disadvantages. An important disadvantage is that such a covering usually adheres to the wounded skin or flesh as well as to the surrounding healthy surface. With the plastic adhering directly to the wound surface there is little chance for growth of new tissue. Moreover, if new tissue does successfully form, it is apt to be removed along with the plastic covering.

Although hydrogen peroxide has long been recognized as an excellent antiseptic, its use as such has been limited by the fact that upon contact with light or air it quickly breaks down into its more stable constituents and loses its ability to yield further oxygen.

An object of the present invention is to provide an improved protective covering for injured or diseased tissue which will not adhere to the injured surface and which will not impede the formation of new tissue. Another object is to retard the decomposition of hydrogen peroxide when placed upon a wound, thus prolonging the beneficial effects of newly liberated oxygen. Still another object is to provide a means for destroying aerobic and anaerobic bacteria in diseased tissue.

Still another object is to provide a continuous protective film directly over the wound; the film itself being permeated with oxygen or air, or mixtures thereof, in small bubbles so that a quasi-aerobic covering is thereby provided, thus increasing the permeability of the film and making more feasible access of air to the surface of the wound.

In accordance with this invention it is possible to accomplish the above objectives by applying to injured or diseased tissue a liquid composition comprising a stable organic or inorganic peroxide capable of liberating hydrogen peroxide and a plastic material, dissolved in a suitable solvent or solvents. Such a peroxide is urea peroxide, which is a chemical compound composed of about thirty-four per cent (34%) hydrogen peroxide capable of liberation.

The value of the improved wound coating may be best shown by describing the method of its use in the treatment of a wound.

A surface cut in the form of an inch-long scratch on the back of a patient's hand was treated with a coating composition previously prepared as follows: A transparent liquid material was prepared by adding to ten ounces of U. S. P. collodion (a material well known in the art, comprising nitrocellulose dissolved in ethyl alcohol and diethyl ether) one ounce of urea peroxide dissolved in sufficient water-free or substantially water-free glycerol to completely dissolve the urea peroxide. The material thus prepared was applied to the back of the injured hand so as to completely cover the injured area and the surrounding skin. The volatile ethyl alcohol and diethyl ether quickly evaporated leaving the thin film composed essentially of nitrocellulose and urea peroxide with traces of solvents and water covering the wound and the surrounding healthy skin. While this film was forming, the urea peroxide in the immediate vicinity of the wound was acted upon by the enzymes present in the injured tissue so as to break down the hydrogen peroxide molecule into oxygen and water. The oxygen given off by this catalysis of the hydrogen peroxide served to form a pocket directly over the wound and to prevent the film from adhering to the wounded area. The film thus formed was allowed to remain covering the wound until it was judged the wound was healed. During this time additional urea peroxide entrapped in the film was catalyzed as described, so that the wound was maintained essentially in aerobic condition. During the entire period while the wound was covered by the film, as herein described, the progress of healing could be observed through the semi-transparent film containing gas bubbles. The film or membrane is to a certain extent permeable, this being due to the oxygen and air-oxygen bubbles which it contains. Some of these bubbles break through to the outer surface and allow prodigious interchange between the apparently sealed off space and the outside air.

It is to be understood that the above example is only intended to be illustrative and that wide variations therefrom are possible in accordance with our invention.

Although, in the example, we have used nitrocellulose, other plastics may be used in place thereof. We may use any plastic which is soluble in diethyl ether and ethyl alcohol and/or other solvents or mixtures of solvents which will quickly evaporate on exposure to the air. Thus successful films have been produced in accordance with this invention using vinyl resins, and particularly vinyl acetate, acrylate resins, and particularly methyl methacrylate, styrene polymers and copolymers, butadiene polymers and copolymers, cellulose acetate, cellulose acetate propionate, cellulose acetate butyrate, ethyl cellulose, shellac compounds, rubber, halogenated rubber, and rubber hydrohalides. Where the resin employed is not entirely compatible with the hydrogen peroxide containing material it may be necessary to add various stabilizers.

The solvent used may be any solvent or mixture of solvents which has a high rate of evaporation, will not interfere with catalysis of the hydrogen peroxide containing material, will not readily combine with the oxygen released, and will not be harmful to injured tissue. Different solvents will of course be used depending on the plastic material employed. The following solvents are among those which have been found to be most desirable for use in accordance with this invention: various lower alcohols, various lower ethers and mixed ethers, acetone, and carbon tetrachloride.

Where certain plastic materials are used in accordance with our invention it may be desirable to increase the flexibility of the film produced therefrom by addition of plasticizers of the liquid composition. Any of the well known plasticizers may be used provided they are not irritating to injured tissue, will not interfere with the catalysis and will not readily combine with oxygen. Thus various oils such as castor oil and tung oil have been used. Also desirable in some instances are various aliphatic and aromatic esters, various phthalates, and especially dibutyl phthalate, ethyl acetate, tricresyl phosphate, glycol, glycerols and other polyhydroxyl alcohols.

Before the protective film is applied to the injured area in accordance with this invention any of the well known antiseptics, pain depressors or other external medications may be applied in accordance with standard medical practice.

From the foregoing it will be seen that the present invention provides a surgical dressing with many advantages not heretofore available. Thus dressings applied in accordance with this invention are quickly and easily applied with little regard to the location of the injury. These dressings provide a tough, flexible, sanitary and shock-resistant protection for wounds. They supply a constantly renewed supply of oxygen, or oxygen-air mixtures, making them particularly desirable in combating anaerobic bacteria such as the gas bacillus. If it is thought desirable to watch the progress of the healing of a wound, the film produced in accordance with this invention may be made from a transparent plastic. A particularly desirable feature of dressings in accordance with this invention is that they will not impede healing by chafing against or adhering to the wounded area.

Having thus described the invention, what is claimed as new and desired to be secured by Letters Patent is:

1. A liquid composition forming a protective wound coating on exposure to air and comprising nitrocellulose dissolved in a solvent readily evaporating at room temperature and urea peroxide.

2. A liquid composition forming a protective wound coating on exposure to air and comprising cellulose acetate butyrate dissolved in a solvent readily evaporating at room temperature and urea peroxide.

3. A liquid composition forming a protective wound coating on exposure to air and comprising ethyl cellulose dissolved in a solvent readily evaporating at room temperature and urea peroxide.

4. A liquid composition forming a protective wound coating on exposure to air and comprising a plastic dissolved in ethyl alcohol and diethyl ether and urea peroxide.

5. A liquid composition forming a protective wound coating on exposure to air and comprising a plastic dissolved in a solvent readily evaporating at room temperature and urea peroxide dissolved in glycerol.

6. A liquid composition forming a protective wound coating on exposure to air and comprising nitrocellulose dissolved in ethyl alcohol and diethyl ether and a solution of urea peroxide in glycerol in such quantity that the available hydrogen peroxide content of the liquid composition will be between 0.2% and 0.6% by weight.

7. A liquid composition forming a protective wound coating on exposure to air and comprising a plastic material dissolved in a solvent readily evaporating at room temperature, a plasticizer, and urea peroxide.

ETHAN ALLAN BROWN.
MANUEL H. GORIN.
HAROLD A. ABRAMSON.

REFERENCES CITED

The following references are of record in the file of this patent:

UNITED STATES PATENTS

| Number | Name | Date |
|---|---|---|
| 627,296 | Camnitzer | June 20, 1899 |
| 628,463 | Helbing | July 11, 1899 |
| 1,018,240 | Foregger | Feb. 20, 1912 |
| 1,120,085 | Riley | Dec. 8, 1914 |
| 1,139,774 | Knox | May 18, 1915 |
| 1,563,346 | Downs | Dec. 1, 1925 |
| 1,953,526 | Ainslie et al. | Apr. 3, 1934 |
| 2,097,439 | Beutner | Nov. 2, 1937 |
| 2,120,430 | Rieche | June 14, 1938 |
| 2,160,503 | Hermann | May 30, 1939 |
| 2,275,979 | Molnar | Mar. 10, 1942 |

FOREIGN PATENTS

| Number | Country | Date |
|---|---|---|
| 1,555 | Great Britain | 1911 |

OTHER REFERENCES

Reid et al., Ann. Surg., vol. 118, pages 741–750, October 1943.

Marshak, Phar. Abstracts, August 1945, J. A. P. A. Science Edition, page 202.

Berry et al., The Pharmaceutical Journal, page 193, Feb. 20, 1937.

Drug and Cosmetic Industry, July 1944, page 92.